US011418500B2

(12) United States Patent
Volcoff et al.

(10) Patent No.: US 11,418,500 B2
(45) Date of Patent: Aug. 16, 2022

(54) USER AUTHENTICATION BASED ON COGNITIVE PROFILING

(71) Applicant: International Business Machines Corporation, Armonk, NY (US)

(72) Inventors: Ari Volcoff, Kiryat Tivon (IL); Lior Limonad, Nesher (IL); Roy Abitbol, Zurit (IL); Valentin Dashinsky, Nahariya (IL); Omer Arad, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 16/594,023

(22) Filed: Oct. 6, 2019

(65) Prior Publication Data

US 2021/0105261 A1 Apr. 8, 2021

(51) Int. Cl.
| | | |
|---|---|---|
| H04L 9/40 | (2022.01) | |
| G06N 5/04 | (2006.01) | |
| G06F 11/34 | (2006.01) | |
| G06F 11/30 | (2006.01) | |
| G06F 16/9535 | (2019.01) | |

(52) U.S. Cl.
CPC ........ H04L 63/083 (2013.01); G06F 11/3006 (2013.01); G06F 11/3438 (2013.01); G06F 11/3476 (2013.01); G06F 16/9535 (2019.01); G06N 5/04 (2013.01); H04L 63/20 (2013.01)

(58) Field of Classification Search
None
See application file for complete search history.

(56) References Cited

U.S. PATENT DOCUMENTS

| | | | |
|---|---|---|---|
| 9,348,981 B1 | 5/2016 | Hearn et al. | |
| 2014/0137219 A1 | 5/2014 | Castro et al. | |
| 2015/0105104 A1* | 4/2015 | Cherry | H04W 64/00 |
| | | | 455/456.3 |
| 2015/0150104 A1* | 5/2015 | Melzer | G06N 20/00 |
| | | | 726/7 |
| 2017/0289168 A1 | 10/2017 | Bar et al. | |
| 2019/0095596 A1* | 3/2019 | Manganelli | H04L 63/102 |
| 2019/0158477 A1* | 5/2019 | Nagaratnam | H04W 12/06 |

FOREIGN PATENT DOCUMENTS

CN 103530543 5/2014

OTHER PUBLICATIONS

Evaluating smartphone-base dynamic security questions for fallback authentication (Year: 2016).*
Yusuf Albayram et al., "Evaluating smartphone-based dynamic security questions for fallback authentication: a field study", Human-centric Computing and Information Sciences, Dec. 2016.

* cited by examiner

*Primary Examiner* — Cai Y Chen
(74) *Attorney, Agent, or Firm* — Dvir Gassner

(57) ABSTRACT

User authentication based on cognitive profiling. First, usage by a person of one or more computerized devices is automatically and continuously tracked. A cognitive profile of the person is automatically and continuously generated based on the tracked usage. Responsive to a request for authenticating an identity of the person, a cognitive question is automatically generated based on the cognitive profile, and is presented to a user professing to be the person. An answer to the cognitive question is received from the user. Finally, the identity of the person is automatically authenticated when the answer to the cognitive question is determined to be correct.

11 Claims, 2 Drawing Sheets

USER AUTHENTICATION BASED ON COGNITIVE PROFILING

BACKGROUND

The invention relates to the field of computerized user authentication.

A cognitive password is a knowledge-based authentication form that verifies a user's identity by requiring them to answer a question as to something they intrinsically know. Research on passwords as an authentication method has struggled between memorability and strong security. Passwords that are easily remembered are easily cracked by attackers, but passwords that are difficult to crack are also difficult to remember.

Cognitive password systems offer a solution to this struggle, because they are easy to remember and often hard to crack—unless the attacker manages to gather sufficient information about the user to guess the facts underlying the cognitive password.

Questions developed for cognitive password systems are often classified as being either fact-based or opinion-based. Fact-based systems have questions with answers that are considered independent of an individual's feelings, such as "What is your mother's maiden name?", or "What high school did you attend?". Opinion-based questions, as the name implies, have answers based on personal opinions such as "What is your favorite color?".

Many cognitive password systems include a preset list of possible cognitive questions which they offer their users to use. Upon signing up to a cognitive password system, the user provides answers to the cognitive questions provided by the system, and these answers are saved. Later, as the user attempts to log in to the system, they are presented with one or more of these cognitive questions and their answers are compared with the saved answers.

Because cognitive questions tend to repeat themselves across different system (e.g., mother's maiden name, high school, elementary school, first pet, favorite color), they have become relatively easy to crack by some basic diligence on behalf of the attacker.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment related to a computerized method which comprises: automatically and continuously tracking usage by a person of one or more computerized devices; automatically and continuously generating a cognitive profile of the person based on the tracked usage; responsive to a request for authenticating an identity of the person, automatically generating a cognitive question based on the cognitive profile, and presenting the cognitive question to a user professing to be the person; receiving an answer to the cognitive question from the user; and automatically authenticating the identity of the person when the answer to the cognitive question is determined to be correct.

Another embodiment relates to a system which comprises: (a) at least one hardware processor; and (b) at least one non-transitory computer-readable storage medium having program code embodied therewith, the program code executable by said at least one hardware processor to: automatically and continuously track usage by a person of one or more computerized devices; automatically and continuously generate a cognitive profile of the person based on the tracked usage; responsive to a request for authenticating an identity of the person, automatically generate a cognitive question based on the cognitive profile, and present the cognitive question to a user professing to be the person; receive an answer to the cognitive question from the user; and automatically authenticate the identity of the person when the answer to the cognitive question is determined to be correct.

A further embodiment relates to a computer program product for computerized user authentication, the computer program product comprising a non-transitory computer-readable storage medium having program code embodied therewith, the program code executable by at least one hardware processor to: automatically and continuously track usage by a person of one or more computerized devices; automatically and continuously generate a cognitive profile of the person based on the tracked usage; responsive to a request for authenticating an identity of the person, automatically generate a cognitive question based on the cognitive profile, and present the cognitive question to a user professing to be the person; receive an answer to the cognitive question from the user; and automatically authenticate the identity of the person when the answer to the cognitive question is determined to be correct.

In some embodiments, the generating of the cognitive profile comprises: applying a named-entity recognition (NER) algorithm to the tracked usage, to detect named entities appearing in unstructured texts of the tracked usage; estimating an amount of knowledge the person has with respect to each of the named entities, based on a prevalence of each of the named entities in the unstructured texts; and searching an information resource for information on the one or more of the named entities with which the person was estimated to have an amount of knowledge above a predefined threshold, wherein the information is not included in the tracking usage; wherein the generated cognitive question is based on the information.

In some embodiments, the generating of the cognitive profile comprises: applying a sentiment analysis algorithm to the tracked usage, to estimate an opinion the person has on named entities appearing in unstructured texts of the tracked usage; and wherein the generated cognitive question is phrased to test an opinion the user has on one or more of the named entities.

In some embodiments, the generating of the cognitive profile comprises: applying a topic modeling algorithm to the tracked usage, to discover topics occurring in unstructured texts of the tracked usage; applying a sentiment analysis algorithm to the tracked usage, to estimate an opinion the person has on the discovered topics; wherein the generated cognitive question is phrased to test an opinion the user has on one or more of the discovered topics.

In some embodiments, the tracking comprises operating a software agent on each of the one or more computerized devices, wherein the software agent logs activity of the person in one or more software applications running on the one or more computerized devices.

In some embodiments: the one or more software application comprises a web browser, the software agent is implemented in the web browser, and the logged activity comprises a web browsing history.

In some embodiments, the cognitive question is generated to be different than all previous cognitive questions generated for the person.

In some embodiments, the cognitive question is generated based on a portion of the cognitive profile which was generated, based on the tracked usage, over a predefined period immediately preceding the request for authentication.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a method, a system, and a computer program product for user authentication based on cognitive profiling. Usage of one or more computerized devices by a person is automatically and continuously tracked. A cognitive profile of the person is automatically and continuously generated based on the tracked usage. The cognitive profile includes, for example, implicit knowledge, preference, and/or opinions the user is estimated to have as to entities and/or topics appearing in the tracked usage. Then, when authentication of the identity of the person is required, a cognitive question is automatically generated based on the cognitive profile, and is presented to a user professing to be the person. An answer ('cognitive password') to the cognitive question is received from the user, and the identity of the person is automatically authenticated when the cognitive password is determined to be correct.

Figure 1:
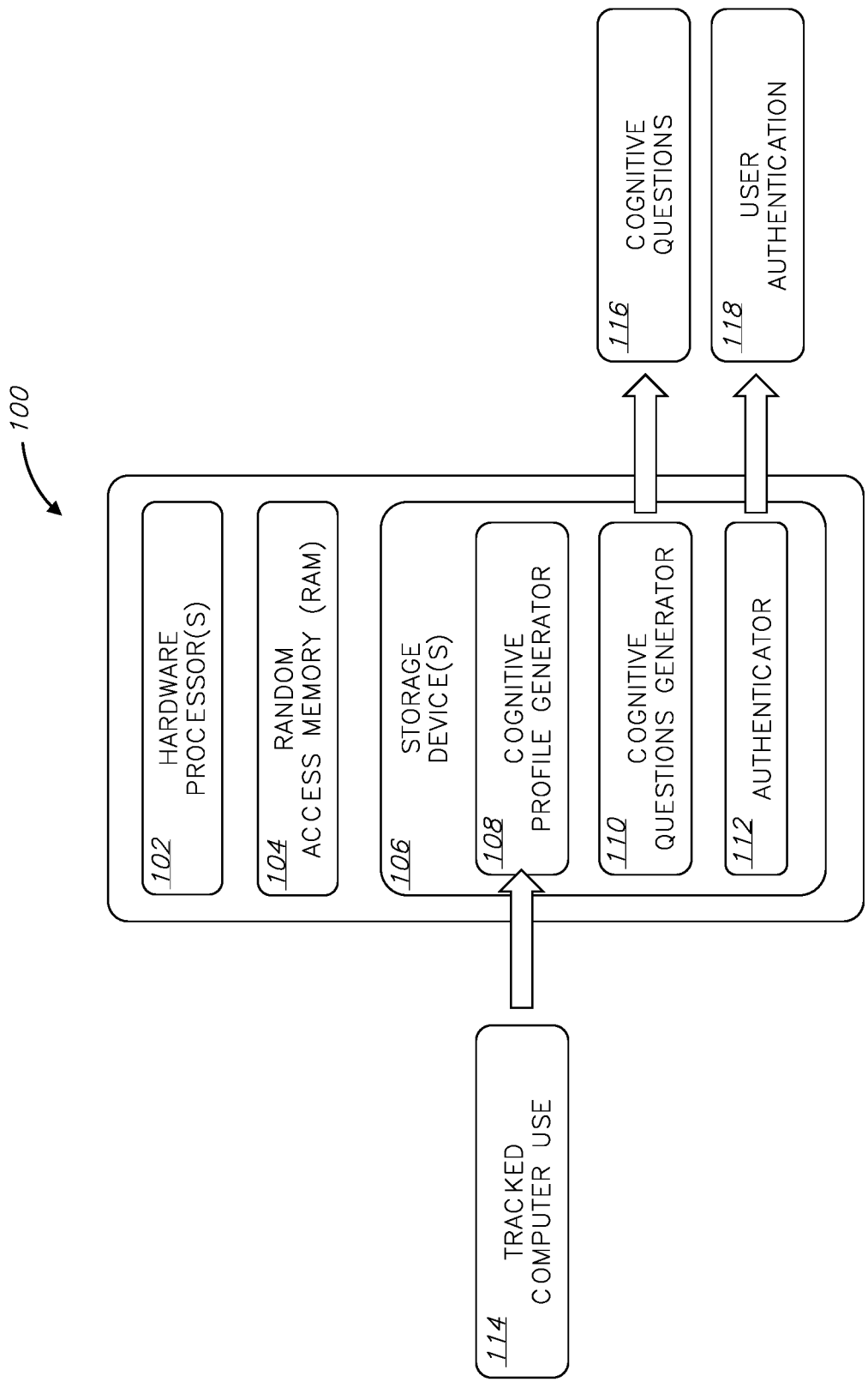
FIG. 1 is a block diagram of an exemplary system for user authentication based on cognitive profiling, according to an embodiment.

Reference is now made to FIG. 1, which shows a block diagram of an exemplary system 100 for user authentication based on cognitive profiling, according to an embodiment. System 100 may comprise one or more hardware processor(s) 102, random-access memory (RAM) 104, and one or more non-transitory computer-readable storage device(s) 106.

Storage device(s) 106 may have stored thereon software instructions or components configured to operate a processing unit (also "hardware processor," "CPU," or simply "processor"), such as hardware processor(s) 102. In some embodiments, the software components may include an operating system, having various software components and/or drivers for controlling and managing general system tasks (e.g., memory management, storage device control, power management, etc.), and facilitating communication between various hardware and software components. In some embodiments, the program instructions are segmented into one or more software modules, which may include, e.g., at least one of a cognitive profile generator 108, a cognitive question generator 110, and an authenticator 112.

System 100 may operate by loading instructions of cognitive profile generator 108, cognitive question generator 110 and authenticator 112 into RAM 104 as they are being executed by processor(s) 102. The instructions of cognitive profile generator 108 may cause system 100 to track usage of one or more computerized devices by a person and generate a cognitive profile of the person based on the tracked usage. The instructions of cognitive question generator 110 may cause system 100 to, responsive to a request for authenticating an identity of the person, generate a cognitive question based on the cognitive profile. The instructions of authenticator 112 may cause system 100 to present the cognitive question to a user professing to be the person, receive an answer to the cognitive question from the user, and authenticate the identity of the person when the answer to the cognitive question is correct.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components; merely as an example, the division of the software instructions into separate modules may be different than the one shown, or the software instructions may not at all be separate. System 100 may include any additional component enabling it to function as an operable computer system, such as a motherboard, data busses, power supply, a network interface card, etc. (not shown). Components of system 100 may be co-located or be distributed (e.g., in a distributed computing architecture).

Figure 2:
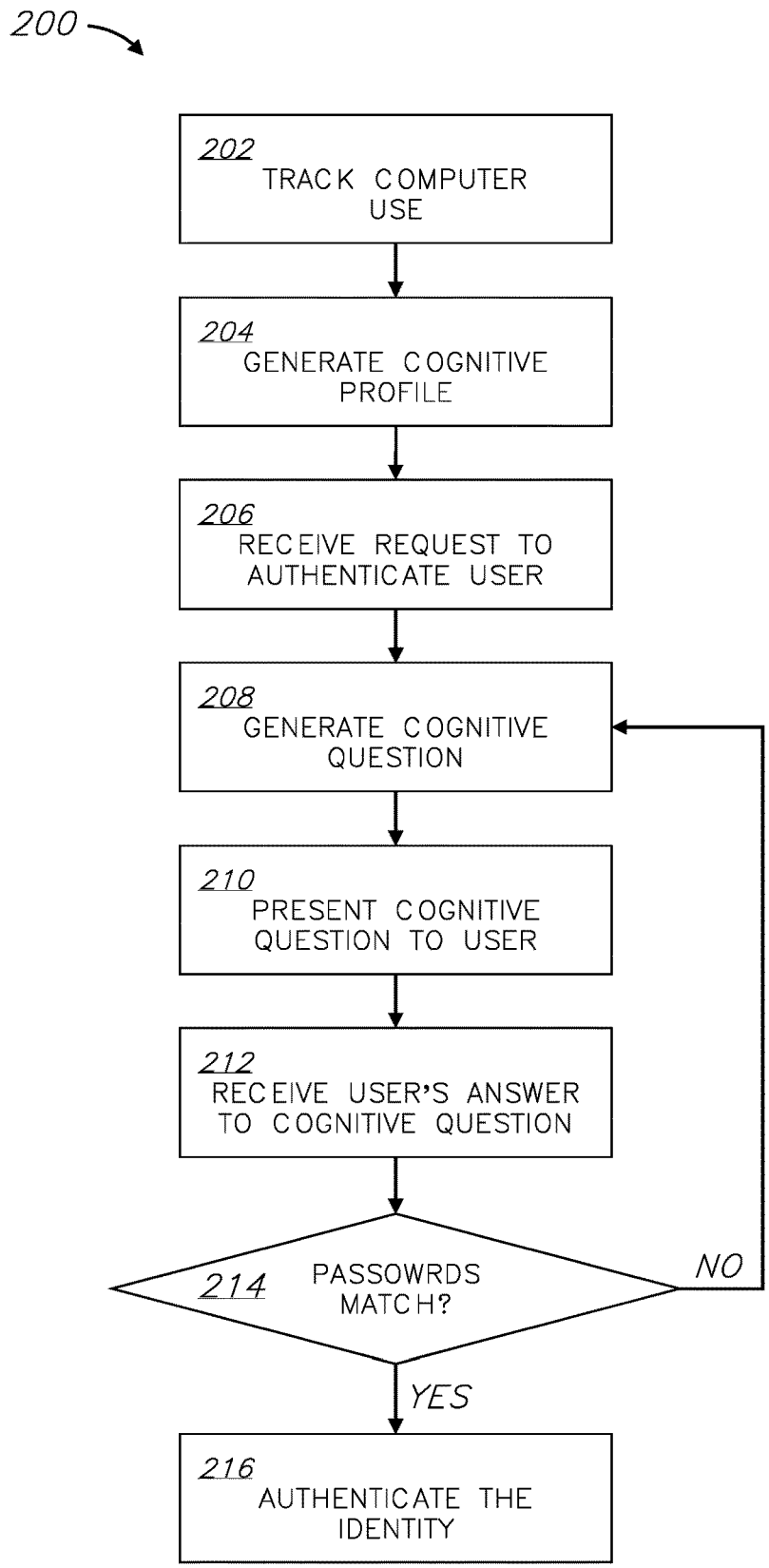
FIG. 2 is a flow chart of an exemplary method for user authentication based on cognitive profiling, according to an embodiment.

The instructions of cognitive profile generator 108, cognitive question generator 110, and authenticator 112 are now discussed with reference to the flowchart of FIG. 2, which illustrates a method 200 for user authentication based on cognitive profiling, in accordance with an embodiment.

Steps of method 200 may either be performed in the order they are presented or in a different order (or even in parallel), as long as the order allows for a necessary input to a certain step to be obtained from an output of an earlier step.

In a step 202, usage by a person of one or more computerized devices may be automatically and continuously tracked. These computerized devices may include, for example, a desktop computer, a laptop computer, a smart phone, a smart watch, a tablet computer, a virtual assistant (sometime referred to as a "digital assistant"), a smart TV, an IoT (Internet of Things) device, and the like.

The tracking may include operating a software agent on the pertinent computerized device, to logs activity of the person in one or more software applications running on the device. The software agent may run in the background, in the operating system of the device, and have suitable permissions to view activity of software applications. For example, the software agent may view activity of a word processing application, and log contents of text files opened by that application. As another example, the software agent may view activity of a messaging application (e.g., an email client, an instant messaging client), and log contents of messages and/or names of other people the person corresponds with. A further example is a software agent that is implemented inside a web browser installed on the device, either as an add-on or as a native feature of the web browser, and log web browsing history of the person (and optionally also the content of web pages viewed by the person). Yet another example is a location logging application which runs on the person's portable computing device (e.g., smart phone, smart watch) and logs locations the person visits.

Additionally or alternatively to running a software agent on the computerized device(s) of the person, logging of the person's activity may be performed by online service providers (e.g., software-as-a-service providers) used by the person. For example, contents of the person's messages may be logged by a web mail provider, contents of the person's text files may be logged by an online storage provider, and data regarding media consumed by the person may be logged by a video streaming provider. Alternatively, step 202 may include interfacing with such Internet services, for example through their APIs (Application Programming Interfaces), to retrieve those contents and metadata.

The tracked usage (i.e., the activity logs) may be stored in a computerized database.

In a step 204, a cognitive profile of the person may be automatically and continuously generated based on the tracked usage. That is, as the person continues to use his or her computerized device(s), newly-added activity logs may continuously be processed in order to maintain the cognitive profile up to date.

The generated cognitive profile may characterize what the person knows, and/or what the person's opinion is on various topics. Optionally, the cognitive profile may intentionally be devoid of information which can be easily gathered from public information on the person, such as the person's public online activity on social networks, message boards, blogs, etc. This way, an attacker will not be able to easily locate or deduce an answer to the cognitive question in available public information. By tracking the usage of computerized devices by the user in step 202, information which is not publicly available may be gathered. Further optionally, the cognitive profile may intentionally be devoid of information which explicitly appears in the tracked usage, so that an attacker who gained access to some of the person's computer history cannot easily guess cognitive answers. Instead, the cognitive profile optionally consists only of implicit preferences, behavioral patterns, and/or opinions of the user, which require some processing of the raw data of the tracked usage and possibly also the gathering of additional information from external sources.

The cognitive profile may be generated, for example, by applying a named-entity recognition (NER) algorithm to the tracked usage, in order to detect named entities appearing in unstructured texts (web page content, word processor documents, media consumption data) that form the tracked usage. In case the activity logs contain pointers to external data, such as URLs (Uniform Resource Locators) of web sites visited by the person, a preliminary step may be to download the contents of these external data before applying the NER algorithm to them.

NER algorithms, as known in the art, locate and classify named entity mentions in unstructured text into predefined types such as person names (including fictional characters), nationalities, religious and political groups, organizations, physical objects, foods, famous events, artwork titles (books, movies, songs, etc.), locations, medical codes, time and date expressions, quantities, monetary values, addresses (either physical addresses, email addresses, or IP addresses), etc.

Examples of NER algorithms that may be used in step 204 include GATE by the University of Sheffield, OpenNLP by the Apache Software Foundation, and spaCy by Matthew Honnibal originally, and later by other contributors.

After the NER algorithm outputs the named entities detected in the tracked usage, an amount of knowledge the person has with respect to each of the named entities may be estimated, so that those named entities the user is highly familiar with, or are part of a repeating behavioral pattern, can serve as the basis for cognitive questions. The estimation may be performed, for example, by measuring the prevalence of each of the named entities in the tracked usage. The prevalence serves as an indirect measure of the person's behavior. The prevalence may either be measured as an absolute number of occurrences of each named entity, or as a relative or normalized measure that ranks the prevalence by a comparison of the number of occurrences.

Prevalence of certain restaurant names in a person's location history may indicate the person's cuisine preference. Prevalence of watching certain movies may indicate that the person likes an actor that appears in these movies. Prevalence of reading certain digital books may indicate the person's literary genre preference. These are just a few examples of how named entities appearing in the tracked usage may be indicative of the person's behavior, knowledge and opinions.

Optionally, to enhance the cognitive profile with information beyond what is included in the tracked usage, an external information resource may be searched for information on one or more of the named entities. For example, a search engine such as Google, a digital encyclopedia such as Wikipedia, a restaurant database such as Yelp, or a movie database such as IMDB may be queried with a named entity resolved by the NER algorithm, and further information about that entity may be obtained from the search results.

For instance, if some of the named entities are restaurants (probably frequented by the person, because their names appeared numerous times in the usage activity), then a Yelp search may lead to information such as the cuisine types of these restaurants. Then, the cognitive profile may be updated to include an indication that the person prefers a certain cuisine (assuming, of course, that a relatively large portion of the restaurants are of that same cuisine), and the cognitive question may be of the sort "What type of cuisine do you like best?". The person will know to answer with the correct cuisine, but another user (e.g., an attacker) will not.

As another example, if some of the named entities are movies (probably watched by the person, because their names appeared numerous times in the usage activity), then an IMDB search may lead to metadata on these movies, such as the names of actors appearing in them and their cinematographic genre. Then, the cognitive profile may be updated to include an indication that the person prefers a certain cinematographic genre or likes a certain actor (assuming, of course, that a relatively large portion of the movies share that same metadata), and the cognitive question may be of the sort "Which movie genre do you like best?" or "Which of the following actors do you like best?".

In addition or as an alternative to estimating the person's knowledge with respect to certain named entities, the generation of the cognitive profile may include estimating an opinion the person may have on resolved named entities. For example, knowing if the person is in favor of or against certain politicians may be valuable for generating a suitable cognitive question. The person's opinion may be estimated by applying a sentiment analysis algorithm (sometime referred to as an "opinion mining algorithm"), as known in the art, to the resolved named entities and the unstructured texts of the tracked usage. The output of the sentiment analysis algorithm may be a list of named entities and the opinion expressed in the unstructured texts with respect to these entities (for example expressed as "pro" or "con" the topic, or a numerical polarity such as −1 for negative sentiment, 0 for neutral sentiment, and 1 for positive sentiment). While it is true that not every text the person reads reflects his or her opinion, the dominancy of a certain opinion in the texts is still a good indicator that the person holds that same opinion. For example, if the user reads many online articles which express a positive sentiment towards a certain politician, it is likely that the person favors the politician and possibly also that politician's party. Therefore, an automatic voting process may take place, defining the person's opinion as the one more prevalent in the texts.

Sentiment analysis may be performed not only on the resolved named entities, but also on abstract topics which are discussed in the unstructured texts of the tracked usage. A topic modeling algorithm, as known in the art, may be applied to the unstructured texts, to discover topics occurring in these texts (such as, for example, "Brexit," "Obamacare," and "Cannabis legalization"). Then, a sentiment analysis algorithm may be applied to these topics and to the unstructured texts, to estimate the person's sentiment with respect to these topics.

Examples of sentiment analysis algorithms that may be used in step 204 include the Tone Analyzer by IBM Corp. and the Stanford CoreNLP by Christopher Manning et al.

In a step 206, a request for authenticating the identity of the person may be received. The request may be received, for example, from a remote server or service a user is trying to access over a network (e.g., the Internet or a local area network), and that remote server or service wishes to use the present invention for authentication purposes. Another example is a computerized device which the user attempts to physically access (i.e. by a man-machine interface of the device), and the device has installed thereon software implementing the present invention or connects to a server that implements the present invention and provides authentication services to the device. Yet a further example is the use of the present invention by a federated identity provider (sometimes referred to as a "single sign-on" provider), which receives frequent requests for authentication from multiple other services the person is subscribed to, in lieu of these other services handling authentication on their own.

The request for authentication may be received after a user professing to be the person (whether this is really the person or an attacker) has provided identifying information such as a user name, a biometric sample, or the like, and a cognitive password is required in order to complete the authentication. The cognitive password may either be used instead of a regular, predefined password, or in addition to such password. The cognitive password may be used in a multi-factor authentication scheme, as known in the art, where the cognitive password serves as one of the factors.

In a step 208, responsive to receiving the request for authentication, a cognitive question is automatically and immediately generated based on the cognitive profile. In a step 210, the cognitive question is presented to a user professing to be the person, and in step 212, an answer ("cognitive password") of the user is received.

The cognitive question is optionally based on a portion of the cognitive profile which has been generated based on tracked usage of a predefined period prior to the request for authentication. When asking about an opinion or preference of the user, the period may be relatively long, because these cognitive parameters usually do not change quickly. The same applies to behavioral patterns which accumulate over long periods of time, such as cuisine preferences, genre preferences, and the like. A 'long' period may be in the magnitude of months or even years. Conversely, when asking about the person's very recent behavior, such as the last movie she watched or the topic of the few articles she read last night, the cognitive question may be generated based on a very recent period in the cognitive profile. This way, the information is still fresh in the person's mind, and he or she can easily recollect the information needed to correctly answer the cognitive question. A 'recent' period may be up to 1, 5, 10, 24, 48, or 72 hours prior to the request for authentication. The predefined period may even be greater than that. Generally, the period is selected so as to maximize the confidence that the user will be able to correctly answer the cognitive question if he or she is indeed the person they profess to be.

The cognitive question may be phrased in a way which either:

1. Tests the user's personal preferences with respect to one or more of the additional named entities (resolved from information obtained on the entities) with which the person was estimated to have an amount of knowledge above a predefined threshold. For example, the predefined threshold may be the top X percentile of knowledge out of all named entities, where X may be, for example, the $50^{th}$ percentile, the $70^{th}$ percentile, the $90^{th}$ percentile, etc. Example questions may be: "What cuisine do you prefer?," "What movie genre do you like most?," "What kind of books do you like reading?," etc.

2. Tests the opinion the user has on one or more of the resolved named entities. For example: "List three politicians which you dislike," "Which political party do you support?," "Are you a Beatles fan?", etc.

3. Tests the opinion the user has on one or more of the discovered topics. For example: "Are you for or against Obamacare?", "Are you for or against Brexit?", "Should the U.S. expand offshore oil drilling?", etc.

The generation of the cognitive question also includes storing the correct answer to the question in memory, so that the user's answer can be checked for correctness.

Optionally, the cognitive question is generated to be different than all previous cognitive questions generated for the person, so that if an attacker managed obtain viewing access to one of the person's verification sessions (a cognitive question and a correct answer), this information will not be usable for a future attack.

The cognitive question may be presented along with a text input box into which the user may type the cognitive password in free text, or along with multiple choices of answers the user has to select from. The same options can be used with a voice user interface, as known in the art, where the cognitive question is read out loud and the user's answer is given via speech.

In a step 214, the answer provided by the user is compared with the correct cognitive password. If there is a match, the identity of the user is authenticated in a step 218. If the answer and the correct cognitive password do not match, then either the method terminates and the identity of the user in not authenticated, or the method returns to step 208 to generate another cognitive question and provide the user with another chance to authenticate as the person.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computerized method comprising:
   automatically and continuously tracking usage by a person of one or more computerized devices;
   automatically and continuously generating a cognitive profile of the person based on the tracked usage;
   responsive to a request for authenticating an identity of the person, automatically generating a cognitive question based on the cognitive profile, and presenting the cognitive question to a user professing to be the person;
   receiving an answer to the cognitive question from the user; and
   automatically authenticating the identity of the person when the answer to the cognitive question is determined to be correct,
   wherein the generating of the cognitive profile comprises at least one of:
   (i) applying a named-entity recognition (NER) algorithm to the tracked usage, to detect named entities appearing in unstructured texts of the tracked usage,
      estimating an amount of knowledge the person has with respect to each of the named entities, based on a prevalence of each of the named entities in the unstructured texts,
      searching an information resource for information on the one or more of the named entities with which the person was estimated to have an amount of knowledge above a predefined threshold, wherein the information is not included in the tracked usage,
      wherein the generated cognitive question is based on the information,
   (ii) applying a sentiment analysis algorithm to the tracked usage, to estimate an opinion the person has on named entities appearing in unstructured texts of the tracked usage,
      wherein the generated cognitive question is phrased to test an opinion the user has on one or more of the named entities,
   (iii) applying a topic modeling algorithm to the tracked usage, to discover topics occurring in unstructured texts of the tracked usage,
      applying a sentiment analysis algorithm to the tracked usage, to estimate an opinion the person has on the discovered topics,
      wherein the generated cognitive question is phrased to test an opinion the user has on one or more of the discovered topics.

2. The method according to claim 1, wherein the tracking comprises operating a software agent on each of the one or more computerized devices, wherein the software agent logs activity of the person in one or more software applications running on the one or more computerized devices.

3. The method according to claim 2, wherein:
   the one or more software application comprises a web browser,
   the software agent is implemented in the web browser, and
   the logged activity comprises a web browsing history.

4. The method according to claim 1, wherein the cognitive question is generated to be different than all previous cognitive questions generated for the person.

5. The method according to claim 1, wherein the cognitive question is generated based on a portion of the cognitive profile which was generated, based on the tracked usage, over a predefined period immediately preceding the request for authentication.

6. A system comprising:
   (a) at least one hardware processor;
   (b) at least one non-transitory computer-readable storage medium having program code embodied therewith, the program code executable by said at least one hardware processor to:
      automatically and continuously track usage by a person of one or more computerized devices,
      automatically and continuously generate a cognitive profile of the person based on the tracked usage,
      responsive to a request for authenticating an identity of the person, automatically generate a cognitive question based on the cognitive profile, and present the cognitive question to a user professing to be the person,
      receive an answer to the cognitive question from the user, and
      automatically authenticate the identity of the person when the answer to the cognitive question is determined to be correct,
      wherein the generating of the cognitive profile comprises at least one of:
      (i) applying a named-entity recognition (NER) algorithm to the tracked usage, to detect named entities appearing in unstructured texts of the tracked usage,
         estimating an amount of knowledge the person has with respect to each of the named entities, based on a prevalence of each of the named entities in the unstructured texts,
         searching an information resource for information on the one or more of the named entities with which the person was estimated to have an amount of knowledge above a predefined threshold, wherein the information is not included in the tracked usage,
         wherein the generated cognitive question is based on the information,
      (ii) applying a sentiment analysis algorithm to the tracked usage, to estimate an opinion the person has on named entities appearing in unstructured texts of the tracked usage,
         wherein the generated cognitive question is phrased to test an opinion the user has on one or more of the named entities,
      (iii) applying a topic modeling algorithm to the tracked usage, to discover topics occurring in unstructured texts of the tracked usage,
         applying a sentiment analysis algorithm to the tracked usage, to estimate an opinion the person has on the discovered topics,
         wherein the generated cognitive question is phrased to test an opinion the user has on one ore more of the discovered topics.

7. The system according to claim 6, wherein the tracking comprises operating a software agent on each of the one or more computerized devices, wherein the software agent logs activity of the person in one or more software applications running on the one or more computerized devices.

8. The system according to claim 7, wherein:
   the one or more software application comprises a web browser,
   the software agent is implemented in the web browser, and
   the logged activity comprises a web browsing history.

9. The system according to claim 6, wherein the cognitive question is generated to be different than all previous cognitive questions generated for the person.

10. The system according to claim 6, wherein the cognitive question is generated based on a portion of the cognitive profile which was generated, based on the tracked usage, over a predefined period immediately preceding the request for authentication.

11. A computer program product for computerized user authentication, the computer program product comprising a non-transitory computer-readable storage medium having program code embodied therewith, the program code executable by at least one hardware processor to:
- automatically and continuously track usage by a person of one or more computerized devices;
- automatically and continuously generate a cognitive profile of the person based on the tracked usage;
- responsive to a request for authenticating an identity of the person, automatically generate a cognitive question based on the cognitive profile, and present the cognitive question to a user professing to be the person;
- receive an answer to the cognitive question from the user; and
- automatically authenticate the identity of the person when the answer to the cognitive question is determined to be correct,
- wherein the generating of the cognitive profile comprises at least one of:
  - (i) applying a named-entity recognition (NER) algorithm to the tracked usage, to detect named entities appearing in unstructured texts of the tracked usage,
    - estimating an amount of knowledge the person has with respect to each of the named entities, based on a prevalence of each of the named entities in the unstructured texts,
    - searching an information resource for information on the one or more of the named entities with which the person was estimated to have an amount of knowledge above a predefined threshold, wherein the information is not included in the tracked usage,
    - wherein the generated cognitive question is based on the information,
  - (ii) applying a sentiment analysis algorithm to the tracked usage, to estimate an opinion the person has on named entities appearing in unstructured texts of the tracked usage,
    - wherein the generated cognitive question is phrased to test an opinion the user has on one or more of the named entities,
  - (iii) applying a topic modeling algorithm to the tracked usage, to discover topics occurring in unstructured texts of the tracked usage,
    - applying a sentiment analysis algorithm to the tracked usage, to estimate an opinion the person has on the discovered topics,
    - wherein the generated cognitive question is phrased to test an opinion the user has on one or more of the discovered topics.

* * * * *